(12) United States Patent
Mullen et al.

(10) Patent No.: US 6,699,567 B2
(45) Date of Patent: Mar. 2, 2004

(54) STAIN RESISTANT FILM CONSTRUCTION

(75) Inventors: Patrick W. Mullen, Winsted, CT (US); Michael J. Hanrahan, Danbury, CT (US)

(73) Assignee: Reflexite Corporation, Avon, CT (US)

( * ) Notice: Subject to any disclaimer, the term of this patent is extended or adjusted under 35 U.S.C. 154(b) by 98 days.

(21) Appl. No.: 09/803,678

(22) Filed: Mar. 9, 2001

(65) Prior Publication Data

US 2001/0036534 A1 Nov. 1, 2001

Related U.S. Application Data

(60) Provisional application No. 60/188,118, filed on Mar. 9, 2000.

(51) Int. Cl.$^7$ .............. B32B 3/00; B32B 15/00; G02B 5/124

(52) U.S. Cl. ............ 428/172; 428/148; 428/164; 359/530

(58) Field of Search .................. 428/172, 164, 428/141, 148; 359/529, 530

(56) References Cited

U.S. PATENT DOCUMENTS

| 3,684,348 A | 8/1972 | Rowland | 350/103 |
|---|---|---|---|
| 3,689,346 A | 9/1972 | Rowland | 156/245 |
| 5,657,162 A * | 8/1997 | Nilsen et al. | 359/530 |
| 5,763,049 A * | 6/1998 | Frey et al. | 428/172 |
| 5,888,618 A | 3/1999 | Martin | 428/156 |

FOREIGN PATENT DOCUMENTS

| EP | 0711658 | 5/1996 |
|---|---|---|
| WO | WO96/18500 | 6/1996 |
| WO | WO96/36480 | 11/1996 |
| WO | WO00/03875 | 1/2000 |

* cited by examiner

*Primary Examiner*—Donald J. Loney
(74) *Attorney, Agent, or Firm*—Hamilton, Brook, Smith & Reynolds, P.C.

(57) ABSTRACT

A stain resistant film construction that includes a polyvinyl film laminated to a polyolefin film by an adhesive. The stain resistant film construction can be formed into a retroreflective product that includes a polyolefin layer, an adhesive layer and a polyvinyl layer attached to the polyolefin layer by the adhesive on the first side of polyvinyl layer. Retroreflective prisms can be attached to the second side of polyvinyl layer, and a backing layer can be attached to the second side of polyvinyl film through the prism layer.

15 Claims, 1 Drawing Sheet

STAIN RESISTANT FILM CONSTRUCTION

RELATED APPLICATION

This application claims the benefit of U.S. Provisional Application No. 60/188,118, filed on Mar. 9, 2000. The entire teachings of the provisional application are incorporated herein by reference.

BACKGROUND OF THE INVENTION

Flexible film retroreflective products are commonly used as tapes or patches on clothing for safety and decorative purposes. Soft flexible face films, such as polyvinyl chloride or polyurethane, are normally preferred for applications, because they tend to be the least restrictive to the wearer's movement. Under certain conditions, however, these materials can become stained in the laundering process.

SUMMARY OF THE INVENTION

The invention includes a stain resistant film construction that includes a polyvinyl film laminated to a polyolefin film by an adhesive. The stain resistant film construction can be formed into a retroreflective product that includes a polyolefin layer, an adhesive layer and a polyvinyl layer attached to the polyolefin layer by the adhesive layer on the first side of polyvinyl film. Retroreflective prisms can be attached to a second side of polyvinyl film, and a backing layer can be attached to the second side of polyvinyl film through the prism layer.

The present invention has the advantage that it provides for a solution for preventing the staining of polyvinyl materials when laundered with stain inducing fabrics.

Figure 1:
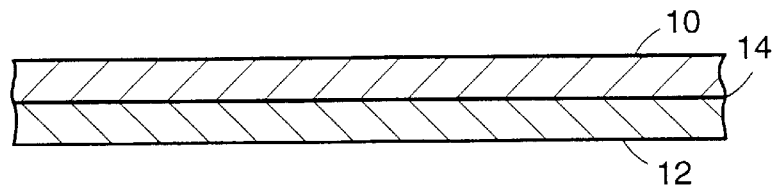
FIG. 1 is a cross-sectional view of a first embodiment of a stain resistant film construction.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All parts and percentages are by weight unless otherwise specified.

As shown in FIG. 1, a layer of a polyolefin film 10, preferably, polyethylene or polypropylene, is attached to a surface of a polyvinyl film 12 in order to form a barrier to a staining component of a fabric. A thin polyolefin film having a thickness that is sufficiently flexible to minimize the loss of desired softness and elongation in the product while maintaining a sufficient barrier. The preferred range of thickness is between about 6 and 125 micrometers. A more preferred thickness is between 10 and 40 micrometers. Preferred polyolefins include polyethylene, polypropylene, polybutylene, polybutenes, polyisoprene and copolymers thereof. The polyolefin film 10 can be attached to the polyvinyl film 12 by an adhesive 14. Polyolefin film 10 can be attached with an adhesive 14, such as a urethane adhesive, an ultraviolet light curing adhesive, a water-based adhesive or a solvent based adhesive, and a hot melt adhesive.

Figure 2:
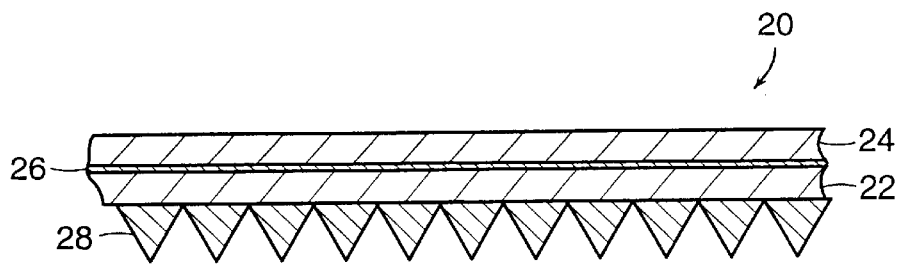
FIG. 2 is a cross-sectional view of a second embodiment of the stain resistant film construction.

Polyvinyl sheeting product 20, which is a retroreflective sheeting, is shown in FIG. 2. Polyvinyl sheeting product 20 has polyvinyl sheeting 22, which is formed from vinyl units. Examples of suitable materials include polyvinyl chloride, polyvinyl fluoride, polyvinylidene fluoride, and polyvinylidene chloride. The polyvinyl sheeting 22 can have plasticizers within the polyvinyl to allow flexibility and softness to the product. A preferred polyvinyl sheeting product is polyvinyl chloride. These plasticizers can leach from the polyvinyl film. When laundered, the plasticizers of the polyvinyl sheeting can react with numerous dyes that are present in the laundry water from other clothing articles that are washed at the same time. For example, the dyes from blue jeans can readily stain a polyvinyl sheeting during a laundering cycle. As a way of avoiding or minimizing staining, polyolefin film 24 is laminated or by other means attached to the layer of polyvinyl sheeting 22. Preferably the films are laminated at a temperature as warm as possible without deforming the film. Polyolefin film 24 can be attached with an adhesive 26, such as a urethane adhesive, an ultraviolet light curing adhesive, a water-based adhesive, a solvent based adhesive, and a hot melt adhesive. A preferred polyolefin is available from Mobil Chemical Company under the name of Bicor. It is a coextruded polypropylene film with an acrylic top coat or layer and surface treatment to promote lamination or print adhesion. In one embodiment, suitable polyvinyl sheeting is in the range of between about 50 and 508 micrometers (two and twenty mils) in thickness. In a preferred embodiment, the polyvinyl material is between 152 and 254 micrometers (six and ten mils) in thickness.

Cast on the second side of the polyvinyl sheeting are prisms 28 that can be attached by methods known in the art including U.S. Pat. No. 3,684,348, issued to Rowland on Aug. 15, 1972 and U.S. Pat. No. 3,689,346, issued to Rowland on Sep. 5, 1972. The teachings of each patent are incorporated herein by reference. For example, the prisms 28 can include polyvinyl. Prisms can also be formed of hard materials, such as polyurethane, polycarbonate or polyacrylate. The prisms can be attached to the polyvinyl film by a suitable method, such as described in U.S. application Ser. No. 08/976,095, filed on Nov. 21, 1997, now issued as U.S. Pat. No. 6,039,909 on Mar. 21, 2000, which corresponds to International Publication WO96/36480, published on Nov. 21, 1996. The teachings of each patent are incorporated herein by reference. The prisms that are attached to the polyvinyl film are typically cube corner prisms but can also include linear prisms. In one embodiment, the cube-corner prisms can have a pitch in a range of between about 38 and 254 micrometers (1.5 and ten mils). In a preferred embodiment, the cube-corner prisms can have a pitch in a range of between about 76 to 152 micrometers (three and six mils).

Figure 3:
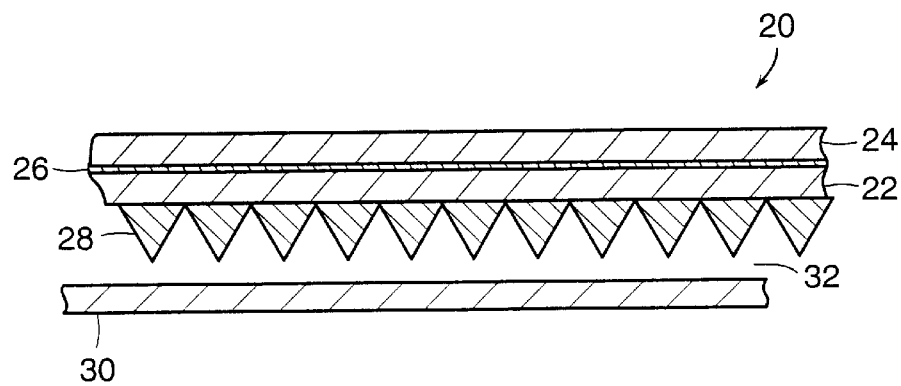
FIG. 3 is a cross-sectional view of a third embodiment of the stain resistant film construction.

In another embodiment, as shown in FIG. 3, a polyvinyl backing layer or other suitable backing layer can be welded by radio frequency welding or other suitable methods to form air spaces 32 between polyvinyl sheeting and a backing layer 30 with prisms 28 attached to a side of polyvinyl within the air spaces 32 to form air-backed prisms.

Figure 4:
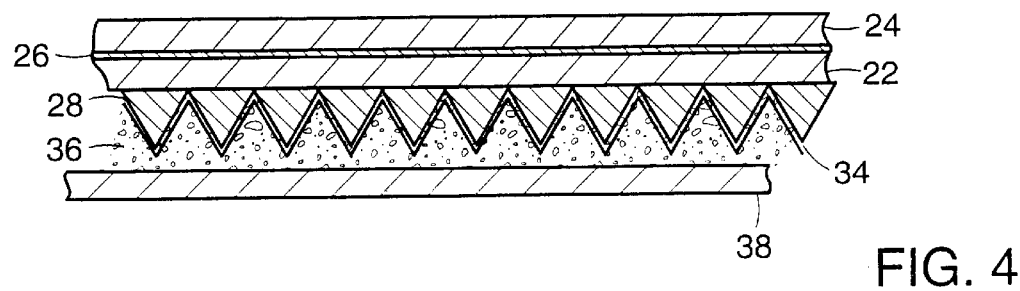
FIG. 4 is a cross-sectional view of a fourth embodiment of the stain resistant film construction.

In yet another embodiment, as shown in FIG. 4, the prisms are coated to form a metalized layer 34 with a reflective material, such as aluminum, silver or gold, and then laminated to a suitable backing layer 38, such as a polymer film or a cloth, with a pressure sensitive adhesive or a heat activated adhesive. This laminate can be sewn onto a garment. In yet another embodiment, the laminate can be attached to the garment directly using the pressure sensitive adhesive or the heat activated adhesive.

EXAMPLE 1

A laminate of Mobil Bicor polypropylene film was laminated to a clear polyvinyl film and attached with a PN 03 polyurethane adhesive from Morton Chemical. On the polyvinyl side of the laminate acrylic prisms were cast and a soft white polyvinyl chloride backing film was radio frequency sealed to the prisms in first polyvinyl layer. The samples were washed with Clopman Sailor Blue dyed polyester cotton fabric at about 68° C. (155° F.) for about twenty-five minutes. A standard Reflexite polyvinyl tape product, Product No. GP330, was also included as a control. The polypropylene-faced tape showed no staining ($\Delta E<8$) while the normal Reflexite polyvinyl tape product was very blue in color ($\Delta E>27$).

EXAMPLE 2

A polyvinyl chloride film (approximately 254 micrometers (10 mils thick)) was coated with a layer of Bostik 7063 solvent adhesive crosslinked with Boscodur 16 (Both from Bostik Corp.). The solvent was evaporated and a 25 micrometers (one mil) thick layer of Mobil Bicor LBW was laminated to the adhesive surface. Retroreflective cube corners were cast onto the other side of the polyvinyl chloride and the structure was radio frequency sealed to a second layer of polyvinyl chloride to form air pockets around the retroreflective cube corners.

EXAMPLE 3

Vinyl film was coated with a ultraviolet curable composition of Sartomer SR981 and SR963 (Sartomer Corp.) with suitable photoinitiators. A 30.5 micrometers (1.2 mil layer) of Mobil Bicor LBW was laminated to the coating and the material was cured with ultraviolet light. A retroreflective multilayer tape product was made with this laminate in the same fashion as Example 1.

EXAMPLE 4

A comparative example of the retroreflective tape was made by the same method as used in Example 2, except that the layer of Mobil Bicor was not laminated to the surface. This material was used for the laundering tests in order to evaluate the effectiveness of the added polyolefin layer.

While this invention has been particularly shown and described with references to preferred embodiments thereof, it will be understood by those skilled in the art that various changes in form and details may be made therein without departing from the scope of the invention encompassed by the appended claims.

What is claimed is:

1. A stain resistant film construction comprising a polyvinyl film laminated to a polyolefin film and bonded by an adhesive, wherein prisms are attached to the polyvinyl film.

2. A stain resistant film construction of claim 1, wherein said prisms include cube-corner prisms.

3. A stain resistant film construction of claim 1, wherein said prisms include a metalized layer.

4. A stain resistant film construction of claim 3, wherein said metalized layer includes a metal selected from a group consisting of aluminum, silver and gold.

5. A stain resistant film construction of claim 4, wherein an adhesive is attached to said metalized layer.

6. A stain resistant film construction of claim 5, wherein a cloth is attached to said adhesive.

7. A stain resistant film construction of claim 1, wherein a top coat is attached to said polyolefin film.

8. A stain resistant retroreflective product comprising:
    a) a polyolefin layer;
    b) an adhesive layer;
    c) a polyvinyl layer which has a first side and a second side and which is attached to said polyolefin layer by said adhesive on said first side of polyvinyl layer;
    d) retroreflective prisms attached to said second side of polyvinyl layer; and
    e) a backing layer attached to said prism layer.

9. A stain resistant film construction of claim 8, wherein the polyvinyl film is selected from a group consisting of polyvinyl chloride, polyvinyl fluoride, polyvinylidene fluoride, and polyvinylidene chloride.

10. A stain resistant retroreflective product comprising:
    a) a polyolefin layer;
    b) an adhesive layer;
    c) a polyvinyl layer, which has a first side and a second side and which is attached to said polyolefin layer by said adhesive on said first side of polyvinyl layer;
    d) retroreflective prisms attached to said second side of said polyvinyl layer; and
    e) a reflective coating on the prisms.

11. A stain resistant film construction of claim 10, wherein the polyvinyl film is selected from a group consisting of polyvinyl chloride, polyvinyl fluoride, polyvinylidene fluoride, and polyvinylidene chloride.

12. A stain resistant retroreflective product of claim 10 wherein a heat activated adhesive layer is on the reflective coating.

13. A stain resistant retroreflective product of claim 12 wherein a fabric is attached to the heat activated adhesive layer.

14. A stain resistant retroreflective product of claim 10, wherein a pressure sensitive adhesive layer is on the reflective coating.

15. A stain resistant retroreflective product of claim 14 wherein a fabric is attached to the pressure sensitive adhesive layer.

* * * * *